United States Patent
Zhang

(10) Patent No.: US 9,470,709 B2
(45) Date of Patent: Oct. 18, 2016

(54) TEETER TOTTER ACCELEROMETER WITH UNBALANCED MASS

(71) Applicant: Analog Devices, Inc., Norwood, MA (US)

(72) Inventor: Jianglong Zhang, Vienna, VA (US)

(73) Assignee: Analog Devices, Inc., Norwood, MA (US)

( * ) Notice: Subject to any disclaimer, the term of this patent is extended or adjusted under 35 U.S.C. 154(b) by 532 days.

(21) Appl. No.: 13/751,387

(22) Filed: Jan. 28, 2013

(65) Prior Publication Data

US 2014/0208849 A1 Jul. 31, 2014

(51) Int. Cl.
 *G01P 15/125* (2006.01)
 *G01P 15/08* (2006.01)

(52) U.S. Cl.
 CPC ..... *G01P 15/125* (2013.01); *G01P 2015/0834* (2013.01)

(58) Field of Classification Search
 CPC .................................................. G01P 15/125
 See application file for complete search history.

(56) References Cited

U.S. PATENT DOCUMENTS

| | | | |
|---|---|---|---|
| 4,598,585 A | 7/1986 | Boxenhorn | 73/505 |
| 4,670,092 A | 6/1987 | Motamedi | 156/643 |
| 4,869,107 A | 9/1989 | Murakami | 73/517 |
| 5,331,853 A | 7/1994 | Hulsing, II | 73/505 |
| 6,230,566 B1 * | 5/2001 | Lee et al. | 73/514.32 |
| 6,651,500 B2 | 11/2003 | Stewart et al. | 73/511 |
| 6,841,992 B2 | 1/2005 | Yue et al. | 324/162 |
| 7,022,543 B2 | 4/2006 | Eskridge et al. | 438/52 |
| 7,121,141 B2 | 10/2006 | McNeil | 73/514.32 |
| 7,146,856 B2 | 12/2006 | Malametz | 73/514.32 |
| 7,210,352 B2 | 5/2007 | Foster et al. | 73/514.32 |
| 7,578,190 B2 | 8/2009 | Lin et al. | 73/514.29 |
| 7,610,809 B2 | 11/2009 | McNeil et al. | 73/514.32 |
| 8,020,443 B2 | 9/2011 | Lin et al. | 73/514.32 |
| 8,096,182 B2 | 1/2012 | Lin et al. | 73/514.32 |
| 8,171,793 B2 | 5/2012 | Foster | 73/514.32 |
| 8,186,221 B2 | 5/2012 | Lin et al. | 73/514.32 |
| 8,220,330 B2 | 7/2012 | Miller et al. | 73/514.32 |
| 9,297,825 B2 * | 3/2016 | Zhang | G01P 15/08 |
| 2004/0160232 A1 * | 8/2004 | Yue et al. | 324/660 |
| 2005/0268719 A1 * | 12/2005 | Malametz | 73/514.32 |
| 2006/0021436 A1 | 2/2006 | Kapser et al. | 73/514.38 |
| 2006/0169043 A1 * | 8/2006 | McNeil | 73/514.01 |
| 2006/0185433 A1 * | 8/2006 | Leonardson et al. | 73/514.32 |
| 2007/0000323 A1 | 1/2007 | Kuisma | 73/514.32 |
| 2008/0110260 A1 | 5/2008 | Konno et al. | 73/514.32 |

(Continued)

FOREIGN PATENT DOCUMENTS

| | | | |
|---|---|---|---|
| JP | 5-340956 | 12/1993 | G01P 15/12 |
| JP | 9-189716 | 7/1997 | G01P 15/125 |

(Continued)

*Primary Examiner* — Peter Macchiarolo
*Assistant Examiner* — Natalie Huls
(74) *Attorney, Agent, or Firm* — Sunstein Kann Murphy & Timbers LLP

(57) ABSTRACT

A balanced teeter-totter accelerometer has a mass suspended above a substrate, the mass having an axis of rotation that is parallel to the substrate and substantially geometrically centered with respect to the shape of the mass. A physical acceleration in a direction perpendicular to the substrate causes the mass to rotate about the axis of rotation. The rotation is sensed by measuring a change in capacitance of electrodes on the substrate. The accelerometer may be calibrated using the same sensing electrodes.

20 Claims, 3 Drawing Sheets

(56) References Cited

U.S. PATENT DOCUMENTS

| | | | |
|---|---|---|---|
| 2009/0031809 A1* | 2/2009 | Lin et al. | 73/514.32 |
| 2009/0139331 A1 | 6/2009 | Axelrod et al. | 73/514.32 |
| 2009/0293616 A1* | 12/2009 | Lin et al. | 73/514.32 |
| 2010/0011860 A1 | 1/2010 | Offenberg et al. | 73/514.32 |
| 2010/0024552 A1 | 2/2010 | Foster | 73/514.29 |
| 2010/0107762 A1* | 5/2010 | Classen | G01P 15/0802 73/514.24 |
| 2010/0107763 A1* | 5/2010 | Lin et al. | 73/514.32 |
| 2010/0122579 A1 | 5/2010 | Hsu et al. | 73/514.32 |
| 2010/0242600 A1 | 9/2010 | Lin et al. | 73/504.12 |
| 2010/0242603 A1 | 9/2010 | Miller et al. | 73/514.32 |
| 2010/0313660 A1 | 12/2010 | Nishikage et al. | 73/514.32 |
| 2011/0023606 A1 | 2/2011 | Burghardt et al. | 73/514.32 |
| 2011/0056295 A1 | 3/2011 | Classen | 73/514.32 |
| 2011/0056297 A1* | 3/2011 | Classen | 73/514.32 |
| 2011/0154899 A1 | 6/2011 | Classen et al. | 73/514.32 |
| 2011/0203373 A1 | 8/2011 | Konno | 73/514.32 |
| 2011/0290023 A1 | 12/2011 | Takagi | 73/514.32 |
| 2011/0296917 A1* | 12/2011 | Reinmuth et al. | 73/514.32 |
| 2012/0186347 A1* | 7/2012 | McNeil | 73/514.32 |
| 2012/0216616 A1* | 8/2012 | Schultz | 73/514.38 |
| 2012/0265481 A1* | 10/2012 | Stewart | G01P 15/131 702/141 |
| 2012/0280591 A1* | 11/2012 | Schultz | 310/300 |
| 2013/0167641 A1* | 7/2013 | Heller | 73/514.01 |
| 2014/0074418 A1* | 3/2014 | Lin et al. | 702/96 |
| 2014/0217929 A1 | 8/2014 | Lin et al. | 318/116 |
| 2014/0251011 A1* | 9/2014 | Zhang et al. | 73/514.32 |
| 2015/0053002 A1* | 2/2015 | Ullrich et al. | 73/514.15 |
| 2015/0096378 A1* | 4/2015 | Kigure | 73/514.32 |

FOREIGN PATENT DOCUMENTS

| | | | |
|---|---|---|---|
| JP | 2004-340716 | 12/2004 | G01P 15/125 |
| JP | 2005-529336 | 9/2005 | G01P 15/18 |
| JP | 2008-139282 | 6/2008 | G01P 15/125 |
| JP | 2010-210425 | 9/2010 | G01P 15/125 |
| WO | WO 95/24652 A1 | 9/1995 | G01P 15/08 |
| WO | WO 2008/133183 A1 | 11/2008 | G01P 15/125 |
| WO | WO 2010/055716 A1 | 5/2010 | G01P 15/125 |

* cited by examiner

TEETER TOTTER ACCELEROMETER WITH UNBALANCED MASS

TECHNICAL FIELD

The present invention relates to measuring acceleration using an inertial element, and more particularly to improving the sensitivity of a microelectromechanical system capacitive accelerometer having an unbalanced mass.

BACKGROUND ART

An accelerometer is a type of transducer that converts acceleration forces into electronic signals. Accelerometers are used in a wide variety of devices and for a wide variety of applications. For example, accelerometers are often included various automobile systems, such as for air-bag deployment and roll-over detection. Accelerometers are often also included in many computer devices, such as for motion-based sensing (e.g., drop detection) and control (e.g., motion-based control for gaming).

Microelectromechanical systems ("MEMS," also referred to as "MEMS devices") are a specific type of integrated circuit used in a growing number of applications. For example, MEMS currently are implemented as gyroscopes to detect pitch angles of airplanes, and as accelerometers to selectively deploy air bags in automobiles. In simplified terms, such MEMS devices typically have a very fragile movable structure suspended above a substrate, and associated circuitry that both senses movement of the suspended structure and delivers the sensed movement data to one or more external devices (e.g., an external computer). The external device processes the sensed data to calculate the property being measured (e.g., pitch angle or acceleration).

Some MEMS devices measure acceleration in a preferred direction by means of measuring a torque about an axis of rotation. For example, a mass suspended above a substrate has an off-center axis of rotation, so that more weight is on one side of the axis than on the other side. This uneven distribution of mass results in a moment of inertia about the axis of rotation. When an acceleration is produced in a direction perpendicular to the substrate, the moment of inertia results in a torque about the axis of rotation, causing the suspended mass to rotate. An effective spring constant caused by stresses in the suspension counterbalances the torque, so that under constant acceleration, a fixed angle is obtained after a short time. The angle of rotation, and hence the magnitude of the acceleration, may then be measured. An accelerator with this design is called a "teeter-totter accelerometer," based on the motion of the suspended mass under varying accelerations.

The distance between the substrate and the suspended mass often is measured by sensing a capacitance between the rotating mass and one or more stationary sensing electrodes. These electrodes are spaced equidistantly on opposite sides of the axis of rotation, so the capacitance changes equally (but oppositely) for each electrode as the mass rotates. The accelerometer may be calibrated for non-zero accelerations by clamping different voltages to one or more driving electrodes to produce an electrical torque about the axis of rotation. The suspended mass will deflect a certain distance, but will resist further deflection due to the presence of the effective mechanical spring constant. The voltage clamps are then released, and the time variation of the capacitances through the sensing electrodes are measured. A computation is then performed using knowledge of the spring constant to determine the mechanical torque produced by the voltage clamps. The effective "acceleration" at the given voltages may be determined using knowledge about the weight distribution of the suspended mass.

Summary of Various Embodiments of the Invention

In accordance with a first embodiment, a microelectromechanical accelerometer has a substrate, a mass suspended above the substrate, a first readout electrode, and a second readout electrode. The substrate has a top surface. The suspended mass has a top surface facing away from the top surface of the substrate and a bottom surface facing toward the top surface of the substrate, and has first and second lateral ends. The suspended mass is adapted to rotate about an axis that is substantially geometrically centered between the first and second lateral ends. The suspended mass comprises a first section between the axis and the first lateral end and a second section between the axis and the second lateral end, where the first section has a greater weight than the second section. The first readout electrode is attached to the top surface of the substrate, facing the bottom surface of the first lateral end of the suspended mass. The second readout electrode is attached to the top surface of the substrate facing the bottom surface of the second lateral end of the suspended mass.

Various modifications to the basic design are contemplated. For example, the mass may be suspended above the substrate using at least one flexure. Or, the accelerometer may further comprise a third electrode attached to the top surface of the substrate, the third electrode having the same electrical potential as the mass. In this case, an output acceleration may be determined as a function of voltages sensed on the first, second, and third electrodes. Alternately or in addition, the first section and second section may have apertures, and the apertures of the second section have a larger volume than the apertures of the first section. The first section may have a weight affixed to the top surface or the bottom surface of the suspended mass. Or, the first section may be fabricated from a heavier material than the second section.

A second embodiment of the invention involves a method of using a microelectromechanical system accelerometer. The accelerometer has a mass suspended above a substrate, and the mass is able to rotate about an axis of rotation. The accelerometer has a first substrate electrode capacitively coupled to a first section of the mass on a first side of the axis of rotation, and a second substrate electrode capacitively coupled to a second section of the mass on a second side of the axis of rotation. The method begins by determining an offset by applying an electrical potential to the first and second electrodes, and compensating for the offset by applying an electrical potential to one or both of the first and second electrodes. Next, the method includes sensing a physical acceleration of the accelerometer by measuring an electrical capacitance of the suspended mass. The method concludes by producing an output voltage that is a linear function of the measured electrical capacitance. The method requires that the axis of rotation is substantially geometrically centered between the first and second sections of the mass.

Various modifications of the method are contemplated. For example, calibrating the accelerometer may include first causing an electrical potential to form between the first electrode and second electrode, thereby causing the mass to rotate about the axis of rotation in a given direction against a mechanical restoring (spring) force; then removing the electrical potential between the first electrode and second electrode, thereby allowing the restoring force to rotate the mass in a direction opposite to the given direction; and finally, while the mass rotates in the opposite direction, sensing an electrical potential between the first electrode and third electrode, thereby determining a proportionality constant. In this embodiment, reading out a sensed acceleration may include multiplying the measured output voltage by the proportionality constant. Alternately or in addition, an embodiment may require that the first section of the mass has a greater weight than the second section of the mass. In particular, the first section may have a weight affixed to the top surface or the bottom surface of the suspended mass. Or, the first section may be fabricated from a heavier material than the second section.

In accordance with other embodiments, a MEMS accelerometer has a substrate with first and second electrodes, and a mass forming a first variable capacitance with the first electrode, and a second variable capacitance with the second electrode. The accelerometer also has a spring connecting the mass at a point on the mass that is substantially equidistant between the first and second ends of the mass. The spring is connected to the substrate, and the mass has a center of mass spaced a first distance from the first end, and a second distance from the second end. The first and second distances are different.

Various modifications to these other embodiments are contemplated. For example, the mass may have a first portion between its center and the first end, and a second portion between its center and the second end, the first portion having a greater weight than the weight of the second portion. The first section and the second section may have apertures, and the apertures of the second section have a larger volume than the apertures of the first section. Alternatively or in addition, the first section may have a weight affixed to the top surface or the bottom surface of the suspended mass. Also, the first section may be fabricated from a heavier material than the second section.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Mechanical clip level" in an accelerometer means the maximum measurable output acceleration in a given direction due to mechanical limitations.

"Offset bias" in an accelerometer means a bias voltage present on a pin of the accelerometer when no physical acceleration is present.

"Substantially symmetric" means fabricated to within a given tolerance of being perfectly geometrically symmetric. The given tolerance is determined as a function of the fabrication process and the equipment used to make the accelerometer.

Prior art MEMS teeter-totter accelerometers suffer from a number of disadvantages. Firstly, the suspended mass can rotate farther in one direction than in the other direction before contacting the substrate. Undesirably, this can cause the maximum measurable acceleration to be different in one direction than in the opposite direction. Secondly, as with many other MEMS devices, the accelerometer experiences asymmetrical stresses after manufacturing due to the different distances from the electrodes to the center of the package. These stresses may cause an undesired output reading when no acceleration is actually present (hereinafter called an "offset bias"). Thirdly, the sensing electrodes are typically placed equidistantly from the axis of rotation, and the off-center placement of the axis requires the sensing electrodes to be close to the axis so that they may both face the suspended mass. Accordingly, because they are near the axis of rotation, the changing distance between the sensing electrodes and the moving mass (i.e., the variable capacitors) is very small. This undesirably reduces the device sensitivity, consequently decreasing the signal to noise ratio.

The above noted disadvantages, among others, are addressed by geometrically centering the axis of rotation in the suspended mass. With a centered axis of rotation, the mechanical clip level in each direction of acceleration is the same, and offset bias due to manufacturing imprecision is reduced or eliminated. However, centering the axis of rotation balances the weights on either side of the axis, thereby eliminating any beneficial torque that would be produced due to an acceleration in the preferred direction. To solve this problem, the design of the accelerometer is altered to add or remove weight from one side of the suspended mass. Now that it can rotate about a central axis, both sensing electrodes can be moved away from the central axis of rotation. In other words, because the axis of rotation is now centered, the sensing electrodes may be placed on the substrate facing the extremities of the suspended mass, rather than near its center. Moving the sensing electrodes farther from the axis of rotation favorably increases both the device sensitivity and the signal-to-noise ratio.

Figure 1A:
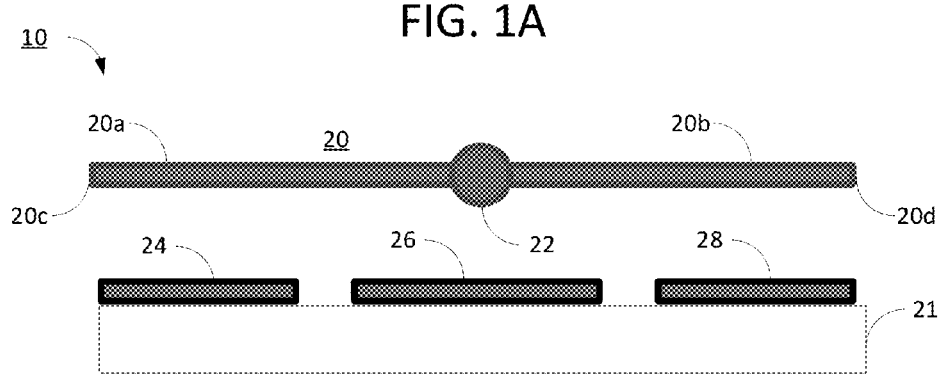
FIGS. 1A-1B schematically show a balanced teeter-totter accelerometer according to an embodiment of the invention.
Figure 1B:
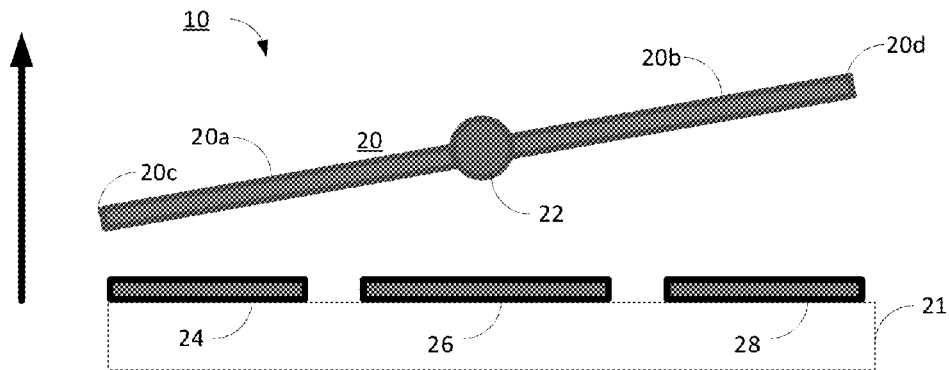

FIGS. 1A-1B schematically show a teeter-totter accelerometer 10 configured in accordance with an illustrative embodiment of the invention. The embodiment shown in these Figures is implemented as a single die having microstructure for determining acceleration in a direction generally normal to its top surface. To that end, the die shown in FIGS. 1A and 1B includes a mass 20 suspended above a substrate 21 having three electrodes 24, 26, 28. More specifically, the suspended mass 20 has both physical properties (including a mass and a moment of inertia) and electrical properties (it acts as an electrode). The suspended mass 20 typically has the same electrical potential as electrode 26, as described in more detail below. Electrodes 24, 28 are coupled capacitively to the suspended mass 20, and therefore act as sensing electrodes for sensing movement of the mass 20. Application of an appropriately directed acceleration to the mass 20 causes it to rotate about an axis of rotation, which is identified in the drawings by reference number "22." The two sections 20a and 20b of the suspended mass 20 on either side of the axis of rotation 22, between its two lateral ends 20c, 20d respectively, are substantially symmetric with respect to the axis of rotation 22 in illustrative embodiments.

FIGS. 1A-1B may be used to show a principle of operation of the teeter-totter accelerometer 10. FIG. 1A shows the device under an absence of external acceleration, in which a common voltage is applied to the suspended mass 20 and electrode 26, and capacitances are measured at sensing electrodes 24, 28 to calibrate the zero-gee point of the device. If the measured capacitances are not equal, the device will have an offset bias that must be compensated during normal operation by applying corrective voltages to electrodes 24, 28. FIG. 1B shows the same MEMS accelerometer 10 subject to an external acceleration in the direction of the arrow (the positive-Z direction). Because the portion 20a of the mass 20 on the left side of the axis of rotation 22 is greater than the portion 20b on the right side, a counter-clockwise torque is generated about the axis of rotation 22, causing the mass to rotate as shown. Acceleration in the opposite direction will cause a rotation in the opposite direction. Rotation in either direction is detected as a varying capacitance on electrodes 24, 28, which have become closer to and further from the suspended mass 20, respectively. The angular deflection of the mass, and hence the size of the variation in capacitance, is related to the magnitude of the acceleration according to a linear conversion function that may be computed or calibrated. Therefore, conventional circuitry (not shown) may apply the conversion function to convert the respective measured capacitances from electrodes 24, 28, and the electrical potential of the suspended mass 20 into a magnitude of acceleration. Typically, this magnitude is embodied as an output voltage signal on a die or chip package that is indicative of the received/detected acceleration. A proportionality constant is provided to convert between a number of output millivolts and the number of measured gees of acceleration.

On-chip or off-chip circuitry thus can determine the precise amount of acceleration sensed by the accelerometer 10 based on these changing capacitance signals. For example, the off-chip circuitry can include another die implemented as an application specific integrated circuit (ASIC) that is within the same package as the accelerometer 10, or in another package. Some embodiments may combine the accelerometer die and the ASIC die in a manner where the ASIC die forms a cap on the accelerometer die. Alternatively or in addition, the off-chip circuitry can also include discrete elements and/or multiple circuitry chips.

As noted, the accelerometer 10 typically has some apparatus to protect its fragile microstructure. Accordingly, as noted, the accelerometer 10 may be positioned within a conventional semiconductor package, such as a ceramic cavity package, a pre-molded leadframe package, a carrier package, or some other package-level device. The package preferably is hermetically sealed in various embodiments, and contains a buffering and/or oxidization mitigation gas to further protect the microstructure.

Other embodiments simply cap the die with either a circuit die (e.g., the ASIC noted above) or an inactive cap. Either type of packaging method (i.e., package-level package or die-level package, among others) thus also includes interconnection leads or pads so that the accelerometer 10 can communicate with devices that are external to the package. For example, the package may be mounted to a printed circuit board (e.g., surface mount, through-hole connection, or other type of connection), which may be within a larger system, such as an automobile airbag control system or mobile telephones.

Figure 2A:
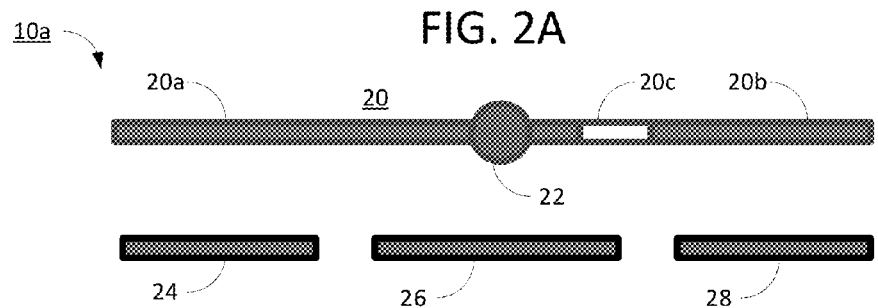
FIGS. 2A-2D schematically show various mass distributions that permit a geometrically balanced design.

Those skilled in the art can vary the weight of the mass 20 in any of a wide variety of different manners. To that end, FIGS. 2A-2D show several methods of varying the weight of the mass 20. In FIG. 2A, section 20b has an aperture/open area 20c, thus making section 20b lighter than section 20a. This embodiment also can have apertures 20c on both sides of the axis of rotation 22, provided that the apertures of the section 20b have a larger volume than those of the section 20a, or vice versa. In other words, as long as one side has more mass/weight, then the accelerometer 10a should function appropriately. This weight can be a simple slug of material, or it could be further microstructure fabricated onto or within the mass 20.

Figure 2B:
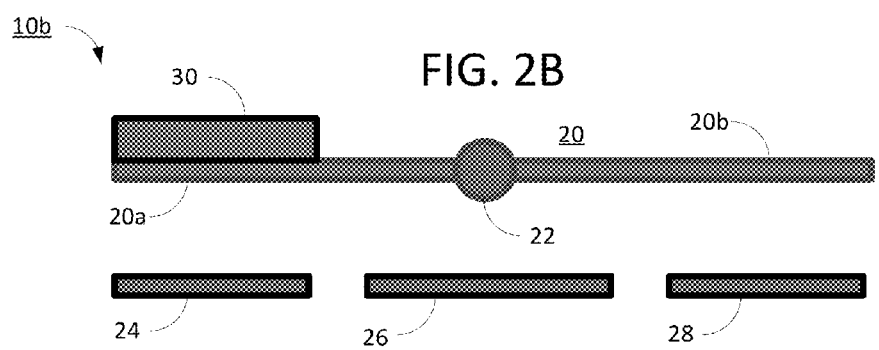
Figure 2C:
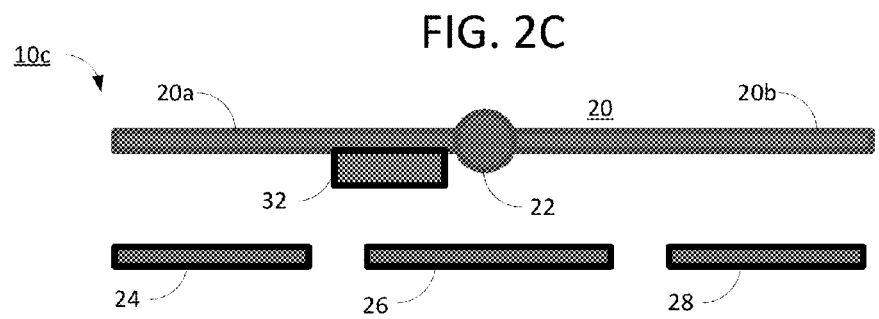
Figure 2D:
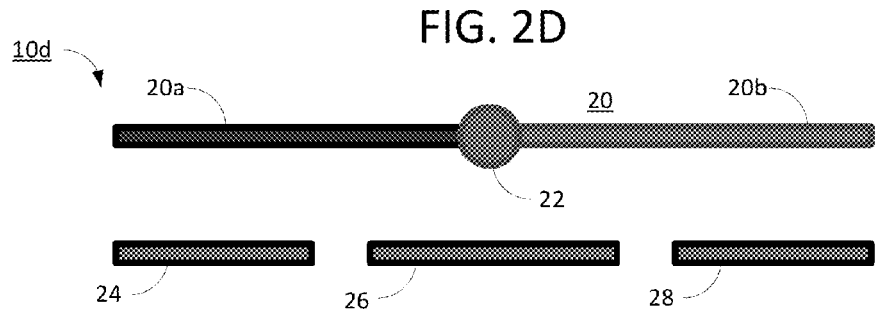

FIG. 2B shows another way of producing an asymmetrical mass distribution about the axis 22. In this case, section 20a of the mass 20 has an additional weight 30 resting on its top side and affixed to it by subsequent manufacturing processes, thus making section 20a heavier. For example, the MEMS fabrication process that formed the accelerometer 10b could deposit an additional layer of material, such as polysilicon or oxide. In a similar manner, FIG. 2C shows an accelerometer 10c in which an additional weight 32 is affixed underneath the suspended mass 20; note that this weight 32 is positioned to avoid altering the measured capacitance between the section 20a and the sensing electrode 24. Accordingly, as shown in FIG. 2C, the weight 32 is not positioned between the mass 20 and the electrode 24 (or electrode 28). FIG. 2D shows yet another method of forming the mass 20, in which the section 20a is formed from a heavier material than that of section 20b. The sizes and positions of the sensing electrodes 24, 28 in this accelerator 10d may be varied depending on the conductivities of the different materials used in the fabrication of the suspended mass.

Those skilled in the art can combine methods from any of those described above with regard to FIGS. 2A-2D, or variations of any of those methods. For example, section 20b of the mass 20 could have an aperture 20c as shown in FIG. 2A, while the other section 20a could have an additional weight 30 or 32. Moreover, other embodiments may simply involve other topological differences that create the weight imbalance—i.e., causing the center of mass of the suspended mass 20 to be closer to one of the lateral edges 20c or 20d.

Accordingly, illustrative embodiments produce a MEMS teeter-totter accelerometer 10 with its suspended mass 20 anchored substantially symmetrically between its ends 20c and 20d. To ensure rotation, the suspended mass 20 is specially configured to be weighted so that its center of mass is not at its geometrical center—namely, not equidistant between the lateral ends 20c and 20d. This accelerometer 10 has several advantages over the known prior art unbalanced teeter-totter accelerometer. Specifically, the prior art accelerometer has two different maximum angular deflections (mechanical clip levels) of the suspended mass due to the geometrical asymmetry of the design, while the embodiment of FIGS. 1A-1B typically does not. Moreover, various embodiments of the present invention have a higher self-test (calibration) level due to its central-anchoring design. Experiments have shown that the calibration level of the device of FIG. 2A is up to 3.5 times the number of gees of the prior art. Because the center of mass in relation to the axis of rotation 22 is unbalanced, the offset bias of the prior art device may be unnecessarily large. Small offsets are especially important for low-gee applications that have small angular deflections of the suspended mass 20. The balanced geometry of the embodiment of FIGS. 1A-1B, by contrast, permits smaller offset biases because the suspended mass 20 may be manufactured using a semiconductor fabrication process that is geometrically symmetric and thus less susceptible to variation. Further, the balanced geometry of the embodiment permits the sensing electrodes 24, 28 to be placed near the lateral ends 20c, 20d of the suspended mass 20.

The accelerometer 10 has other advantages. Specifically, the use of only two substrate sensing electrodes 24, 28 does not require that the accelerometer 10 use separate actuation electrodes to calibrate the proportionality constant between the output voltage and the gees of acceleration to be read out. In particular, an embodiment of the invention may be calibrated, for example, by first applying a bias voltage across electrodes 24 and 26 to cause a physical rotation of the suspended mass 20, and then grounding electrode 24 while measuring the change in potential across electrodes 20 and 28. Thus, the proportionality constant may be determined without separate actuation electrodes to provide the physical offset, unlike in the prior art.

Figure 3B:
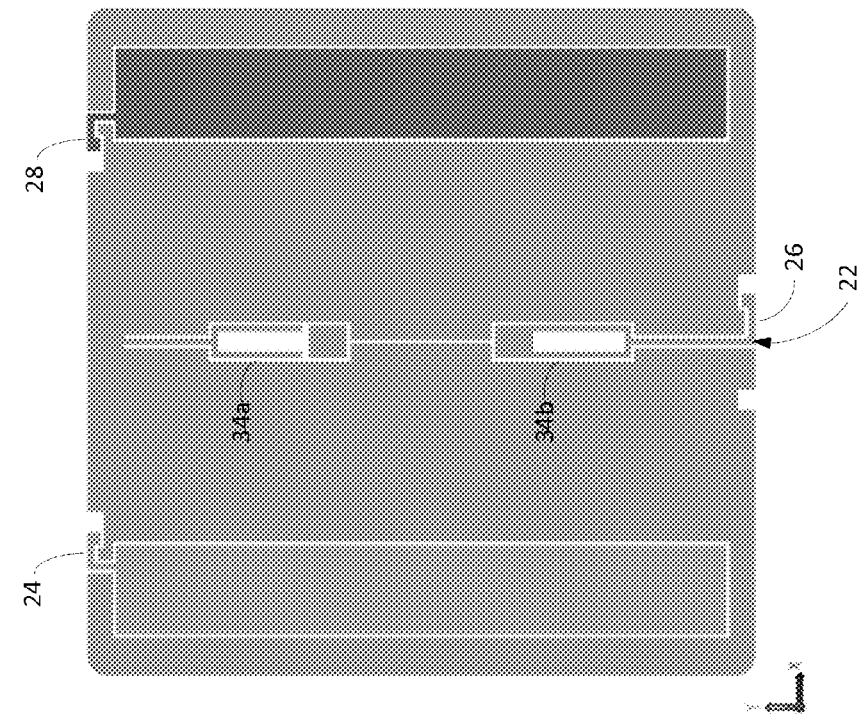
FIGS. 3A-3B show schematic depictions of various layers that form a balanced teeter-totter accelerometer embodiment according to FIG. 2A.
Figure 3A:
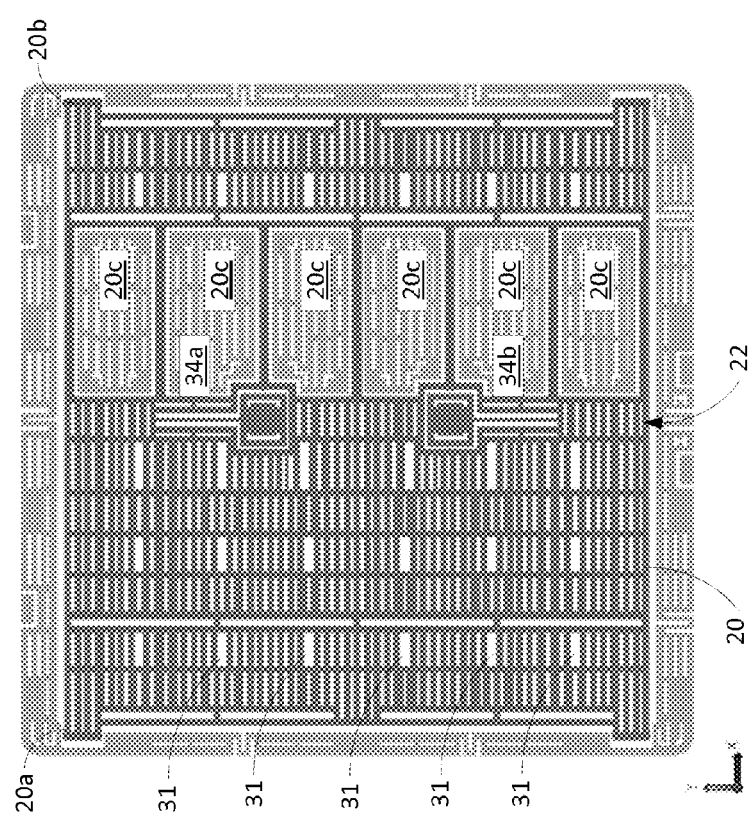

FIGS. 3A-3B schematically show various parts of the balanced teeter-totter accelerometer 10a according to FIG. 2A; namely, the embodiment having holes 20c through the suspended mass 20 to produce an offset center of mass. Specifically, FIG. 3A shows a plan view of a suspended mass 20 (the beam layer), while FIG. 3B shows a plan view of the electrodes (the poly layer). The substrate 21 is not visible in these Figures, but lays underneath the poly layer upon which the electrodes sit. As shown, the mass 20 has a heavy section 20a and a light section 20b above the poly layer. The embodiment of FIG. 3A has many apertures 31 to create the weight/mass imbalance, in addition to holes 20c. The suspended mass 20 is designed to rotate about an axis of rotation 22 as a function of a suspension that includes at least one anchor and flexure (two such anchor-flexure pairs 34a and 34b are indicated in FIG. 3A).

The portions 34a, 34b of the poly layer in FIG. 3B correspond to the two anchor-flexure pairs 34a, 34b of the beam layer shown in FIG. 3A. Moreover, in this instance, the poly layer has two substrate sensing electrodes 24, 28 for dynamically measuring the variable capacitance of the sections 20a, 20b respectively of the suspended mass 20 as it rotates about the axis of rotation 32. As discussed briefly above, during normal operation electrodes 24, 28 apply a balancing voltage to the suspended mass 20 (that is itself acting as an electrode) and a reference voltage is applied to mass 20 and electrode 26. As acceleration is applied, the mass 20 rotates about the axis of rotation 22, and its varying capacitance with respect to the substrate electrodes is then read out, for example by detecting a change in capacitance between the mass 20 and the electrode 26.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A microelectromechanical accelerometer comprising:
a substrate having a top surface; and
a mass suspended above the substrate, the mass having a top surface facing away from the top surface of the substrate and a bottom surface facing toward the top surface of the substrate and having first and second lateral ends, the mass being configured to rotate about an axis that is substantially geometrically centered between the first and second lateral ends, the mass comprising a first section extending from the axis to the first lateral end, the first section fabricated from a first material extending from the axis to the first lateral end, the mass also comprising a second section extending from the axis to the second lateral end, the second section fabricated from a second material extending from the axis to the second lateral end, the second material being different than the first material, the first section having a greater weight than the second section.

2. The accelerometer according to claim 1, wherein the mass is suspended above the substrate using at least one flexure.

3. The accelerometer according to claim 1, further comprising at least one readout electrode on the top surface of the substrate facing the bottom surface of the mass.

4. The accelerometer according to claim 3, wherein the at least one readout electrode includes a first readout electrode facing the bottom surface of the first lateral end of the mass, a second readout electrode facing the bottom surface of the second lateral end of the mass, and a third electrode having the same electrical potential as the mass, and wherein an output acceleration is determined as a function of voltages sensed on the first, second, and third electrodes.

5. The accelerometer according to claim 1, wherein the first section and second section have apertures, and the apertures of the second section have a larger volume than the apertures of the first section.

6. The accelerometer according to claim 1, further comprising a weight affixed to the top or bottom surface of the first section.

7. The accelerometer according to claim 1, further comprising a first readout electrode on the top surface of the substrate opposing the bottom surface of the first section of the mass and a second readout electrode on the top surface of the substrate opposing the bottom surface of the second section of the mass, wherein a size, attachment position, or both of each readout electrode is configured as a function of the conductivity of the material of the opposing section.

8. The accelerometer according to claim 7, wherein the first readout electrode and the second readout electrode have different sizes.

9. A microelectromechanical accelerometer comprising:
a substrate having a top surface; and
a mass suspended above the substrate, the mass having a top surface facing away from the top surface of the substrate and a bottom surface facing toward the top surface of the substrate and having first and second lateral ends, the mass being configured to rotate about an axis that is substantially geometrically centered between the first and second lateral ends, the mass consisting of a first section between the axis and the first lateral end that is fabricated entirely from a first material and a second section between the axis and the second lateral end that is fabricated entirely from a second material different than the first material, the first section having a greater weight than the second section.

10. The accelerometer according to claim 9, wherein the mass is suspended above the substrate using at least one flexure.

11. The accelerometer according to claim 9, further comprising at least one readout electrode on the top surface of the substrate facing the bottom surface of the mass.

12. The accelerometer according to claim 11, wherein the at least one readout electrode includes a first readout electrode facing the bottom surface of the first lateral end of the mass, a second readout electrode facing the bottom surface of the second lateral end of the mass, and a third electrode having the same electrical potential as the mass, and wherein an output acceleration is determined as a function of voltages sensed on the first, second, and third electrodes.

13. The accelerometer according to claim 9, wherein the first section and second section have apertures, and the apertures of the second section have a larger volume than the apertures of the first section.

14. The accelerometer according to claim 9, further comprising a weight affixed to the top or bottom surface of the first section.

15. The accelerometer according to claim 9, further comprising a first readout electrode on the top surface of the substrate opposing the bottom surface of the first section of the mass and a second readout electrode on the top surface of the substrate opposing the bottom surface of the second section of the mass, wherein a size, attachment position, or both of each readout electrode is configured as a function of the conductivity of the material of the opposing section.

16. The accelerometer according to claim 15, wherein the first readout electrode and the second readout electrode have different sizes.

17. A microelectromechanical accelerometer comprising:
a substrate having a top surface; and
a teeter-totter mass suspended above the substrate, the teeter-totter mass having a top surface facing away from the top surface of the substrate and a bottom surface facing toward the top surface of the substrate, the teeter-totter mass configured to rotate about an axis that is substantially geometrically centered between a first lateral end on a first side of the axis and a second lateral end on a second side of the axis, wherein a first portion of the mass extending from the first lateral end on the first side of the axis is fabricated from a first material and a second portion of the mass extending from the second lateral end on the second side of the axis is fabricated from a second material, the second material being different than the first material, the first side of the teeter-totter mass having a greater weight than the second side of the teeter-totter mass.

18. The accelerometer according to claim 17, wherein the mass is suspended above the substrate using at least one flexure.

19. The accelerometer according to claim 17, further comprising at least one readout electrode on the top surface of the substrate facing the bottom surface of the mass.

20. The accelerometer according to claim 17, wherein at least one of:
the first side and second side have apertures, and the apertures of the second side have a larger volume than the apertures of the first side;
the first side includes a weight affixed to the top or bottom surface of the first side; or
the first and second materials have different conductivities.

* * * * *